United States Patent
Rode

(10) Patent No.: US 6,461,051 B1
(45) Date of Patent: Oct. 8, 2002

(54) BEARING ASSEMBLY SPACER ADJUSTMENT SYSTEM AND METHOD FOR ADJUSTING A SPACER

(76) Inventor: John E. Rode, Persee Rd., Fonda, NY (US) 12068

( * ) Notice: Subject to any disclaimer, the term of this patent is extended or adjusted under 35 U.S.C. 154(b) by 1 days.

(21) Appl. No.: 09/711,861

(22) Filed: Nov. 13, 2000

(51) Int. Cl.[7] .................................................. F16C 19/38
(52) U.S. Cl. ................................... 384/551; 29/898.062
(58) Field of Search .................................. 384/551, 563; 29/447, 898.062, 898.07, 898.09, 407.01, 407.08, 407.09

(56) References Cited

U.S. PATENT DOCUMENTS

| | | | |
|---|---|---|---|
| 4,214,465 A | | 7/1980 | Rode .............................. 72/36 |
| 4,611,935 A | | 9/1986 | Rode ............................ 384/548 |
| 5,524,343 A | * | 6/1996 | Blanks ..................... 29/898.09 |
| 5,549,397 A | * | 8/1996 | Rode ............................ 384/551 |
| 5,743,016 A | * | 4/1998 | Manne et al. ........... 29/898.062 |
| 6,128,814 A | * | 10/2000 | Belke et al. .............. 29/407.08 |
| 6,202,306 B1 | * | 3/2001 | Miyazaki .................. 29/898.09 |
| 6,244,751 B1 | * | 6/2001 | Rode ............................ 384/551 |
| 6,283,639 B1 | * | 9/2001 | Rode ............................ 384/551 |
| 6,295,710 B1 | * | 10/2001 | Roberts et al. ........... 29/407.01 |
| 6,327,773 B1 | * | 12/2001 | Rode ............................ 29/724 |

* cited by examiner

Primary Examiner—Christopher P. Schwartz
(74) Attorney, Agent, or Firm—Heslin Rothenberg Farley & Mesiti P.C.; Victor A. Cardona, Esq.; Nicholas Mesiti, Esq.

(57) ABSTRACT

The present invention provides spacer adjustment system for adjusting at least one spacer of a device. The system includes a ram assembly, a contact detector for operatively detecting a contact between the ram assembly and the device, a motor operatively connected to the ram assembly for operatively applying a force to the device, and a controller, operatively connected to the contact detector, for controlling the motor to adjust the at least one spacer.

41 Claims, 6 Drawing Sheets

BEARING ASSEMBLY SPACER ADJUSTMENT SYSTEM AND METHOD FOR ADJUSTING A SPACER

TECHNICAL FIELD

This invention relates generally to the assembly of workpieces and, more particularly, to a system and method for adjusting bearings or the like.

BACKGROUND ART

The assembly of workpieces, such as machinery having rotating parts, frequently requires the precise fitting of antifriction rolling elements such as ball or roller bearings. Tolerances of the manufactured workpiece parts may cause variations in the axial dimensions of the workpiece which may exceed allowable variations for the fitting of bearings therein.

For example a hub upon which a wheel is mounted, for instance, to rotate about a spindle. Such bearings may comprise roller bearings, for example, tapered roller bearings. The spindle may comprise, for instance, an axle or a shaft.

A typical tapered roller bearing includes a cone having an inner race for mounting on a spindle, a cup having an outer race for mounting in a hub, and a plurality of roller elements within a roller cage positioned between the inner and outer races. Commonly, a pair of such tapered roller bearings are mounted on a spindle for rotation thereabout of a wheel mounted on a hub. Cooperating bearings, such as a pair of tapered roller bearings, may be included in a bearing assembly.

In order to properly secure bearings in many axle, spindle, and transmission assemblies, it is necessary to retain the pair of bearings tightly under a predetermined axial load on the shaft or axle, so that they will maintain the proper running clearance of the roller elements under the influence of the combined axial and radial forces which they are designed to support.

One approach to assembling or preloading a bearing arrangement is disclosed in U.S. Pat. No. 4,214,465 to Rode. The preloading or adjustment incorporates use of a deformable spacer which is assembled with the bearings using a hydraulic ram assembly.

Thus, a need exists for a system improving ease, accuracy, and control of adjustment, fitting, assembling, or tailoring of workpieces, e.g. bearing assemblies and spacers thereof.

SUMMARY OF THE INVENTION

The present invention provides, in a first aspect, a spacer adjustment system for adjusting at least one spacer of a device. The system includes a ram assembly, a contact detector for operatively detecting a contact between the ram assembly and the device, a motor operatively connected to the ram assembly for operatively applying a force to the device, and a controller, operatively connected to the contact detector, for controlling the motor to adjust the at least one spacer.

The present invention provides in the second aspect, a method for adjusting at least one spacer of a device. The method includes providing a ram assembly, providing a contact detector for operatively detecting a contact between the ram assembly and the device, providing a motor operatively connected to the ram assembly for operatively applying a force to the device, and providing a controller, operatively connected to the contact detector, for controlling the motor to adjust the at least one spacer.

The present invention provides, in a third aspect, a contact detector for use in spacer adjustment apparatus. The detector includes a first electrical contact located on the ram assembly, a second electrical contact located on an adaptor shaft connectable to a workpiece, a controller coupled to the first electrical contact and the second electrical contact, and wherein the controller is adapted to determine an abutting of the first electrical contact and the second electrical contact.

The present invention provides, in a fourth aspect, a space adjustment system for adjusting at least one spacer of a device. The system includes a ram assembly, a means for detecting an initial position of engagement of the ram assembly with at least one spacer, a motor operatively connected to the ram assembly for operatively applying a force to the device, and a controller, operatively connected to the means for detecting, for controlling the motor to adjust the at least one spacer.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be readily understood from the following detailed description of preferred embodiments taken in conjunction with the accompanying drawings in which:

DETAILED DESCRIPTION

In accordance with the principles of the present invention, presses and methods of providing for assembling workpieces and which are especially suited to adjusting the compressable spacers in the assembly of manufactured items such as worm gear speed reducers, pumps, or motors. Generally such devices require accurate adjustment of the supporting bearing elements such as tapered roller bearings.

Figure 1:
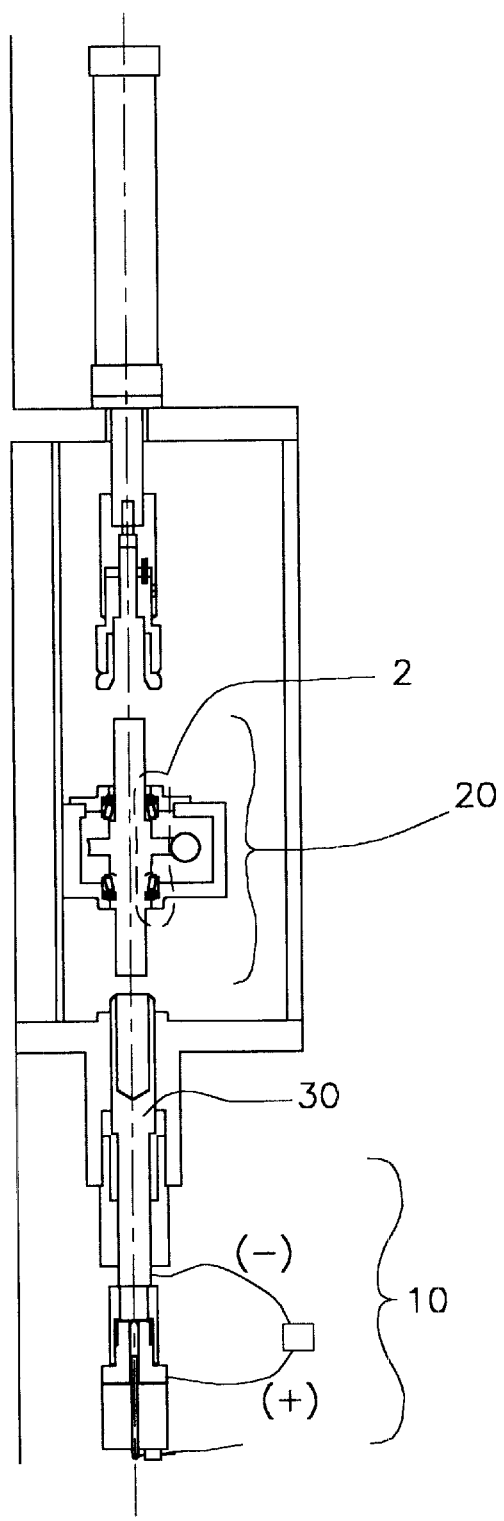
FIG. 1 is a side elevational view of an adjustable spacer system, in accordance with the present invention.

FIG. 1 illustrates one embodiment of a press or a bearing assembly adjustable spacer system 10 axially aligned with a workpiece or bearing assembly 20 and an adapter sleeve or shaft 30. Bearing assembly 20 may be a portion of a worm gear speed reducer or any of various types of bearings assemblies or workpieces as is known by those skilled in the art. Adapter shaft 30 is connectable to bearing assembly 20 and may abut adjustable spacer system 10. Description of various assemblies and work pieces and components thereof are provided, for example, in copending U.S. Pat. application Ser. No. 09/058,059, U.S. Pat. No. 4,611,935 to Rode, and U.S. Pat. No. 4,214,465 to Rode. The contents of these references are hereby incorporated herein by reference.

Figure 2:
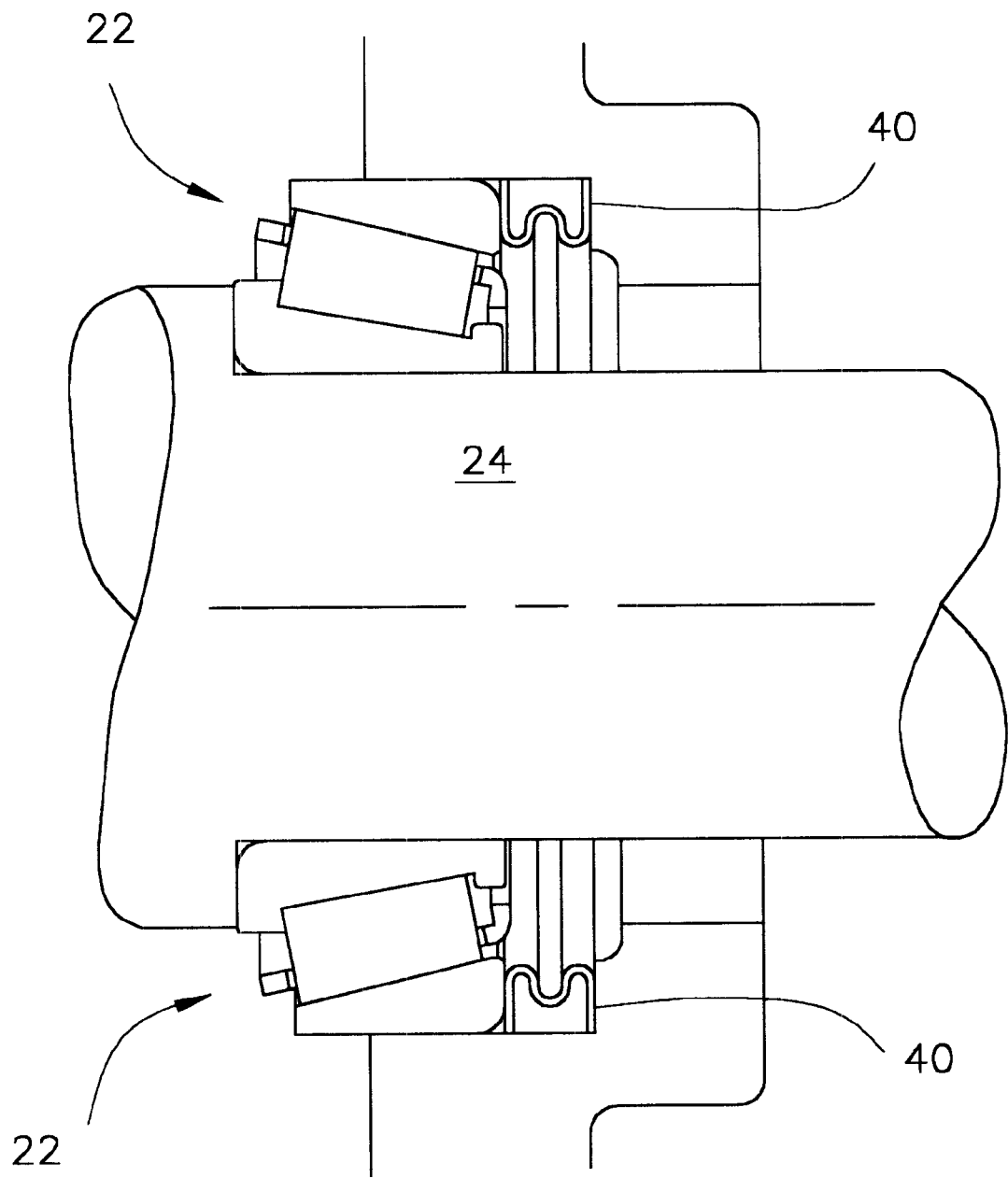
FIG. 2 is enlargement of a portion of the adjustable spacer system of FIG. 1.

FIG. 2 illustrates a portion of bearing assembly 20 of FIG. 1 which includes a pair of bearings 22 (only one of which is showing in FIG. 2), a shaft 24, and a load ring or a spacer 40 which is adjusted by system 10.

FIG.'s 1& 3 depicts spacer adjustment system 10, adapter shaft 30, and a structural member or housing 60 which may support adapter shaft 30. Adapter shaft 30 and housing 60 may be made of steel, for example. A guide 50 may also guide adapter shaft 30 and may be made of a non-conductive material, for example, a plastic material.

Figure 4:
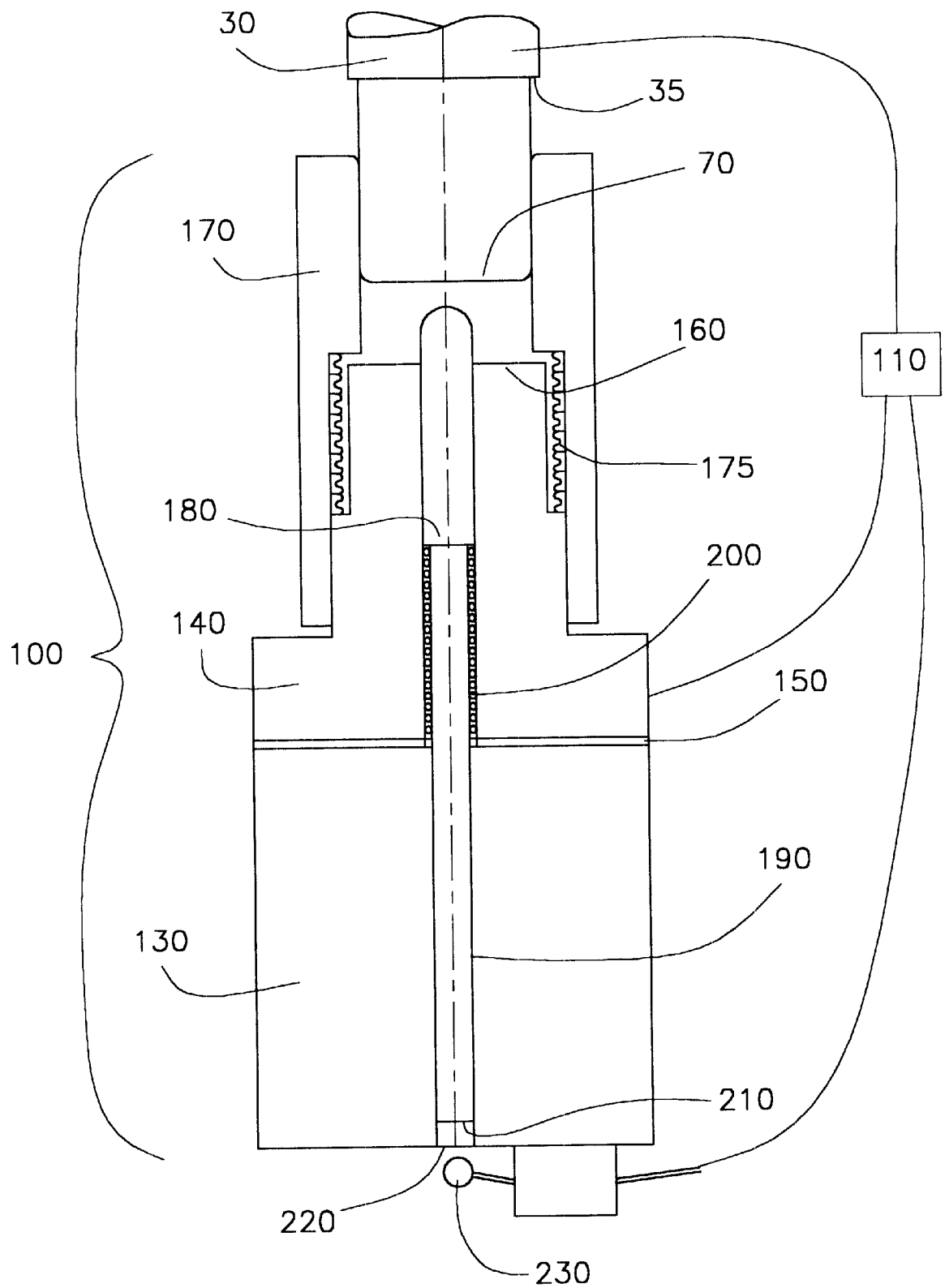
FIG. 4 is an enlargement of a portion the adjustable spacer system of FIG. 3.
Figure 6:
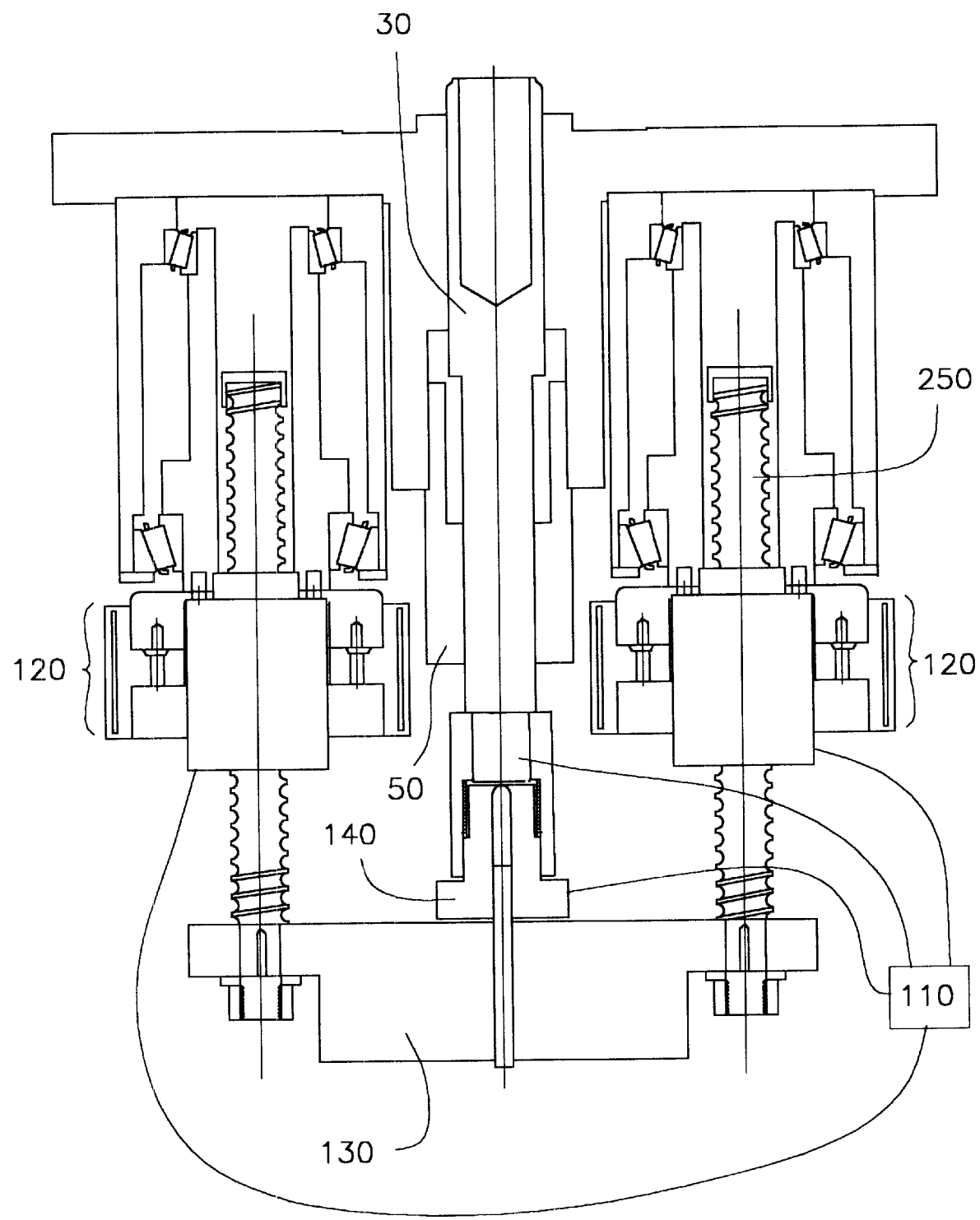
FIG. 6 is a top elevational view of the adjustable spacer system of FIG. 1.

FIG. 4 is an enlargement of spacer adjustment system 10 and an end 70 of adapter shaft 30. Spacer adjustment system 10 may include a ram assembly 100, a controller 110, and a motor 120 (FIG. 6), for example, a servo motor. Alternatively, a spacer adjustment system may include only a subset of the components of spacer adjustment system 10. Ram assembly 100 may include a yoke block or a ram 130 and a switch block 140, separated by insulator 150, along with a switch block housing 170. Ram 130 and switch block 140 may be made, for example, of steel and switch block housing may be made of a nonconductive material, for example, a plastic material.

Spacer adjustment system 10 may also include a contact detector for detecting an initial position and/or engagement or a set up of ram assembly 100 relative to spacer 40. This may then allow subsequent adjustment of the spacer, e.g. compression, relative to this initial position. Specifically such a contact detector may detect a physical contact, for example an initial physical contact, between adapter shaft 30 and switch block 140. The contact detector may include a first electrical contact located on adapter shaft 30 and a second electrical contact located on switch block 140, both contacts being coupled to controller 110. A portion of adapter shaft 30, for example end 70, and a portion of switch block 140, for example an end 160, may comprise such contacts. Alternatively, supplemental electrical contacts may be attached to adapter shaft 30 and switch block 140.

Figure 3:
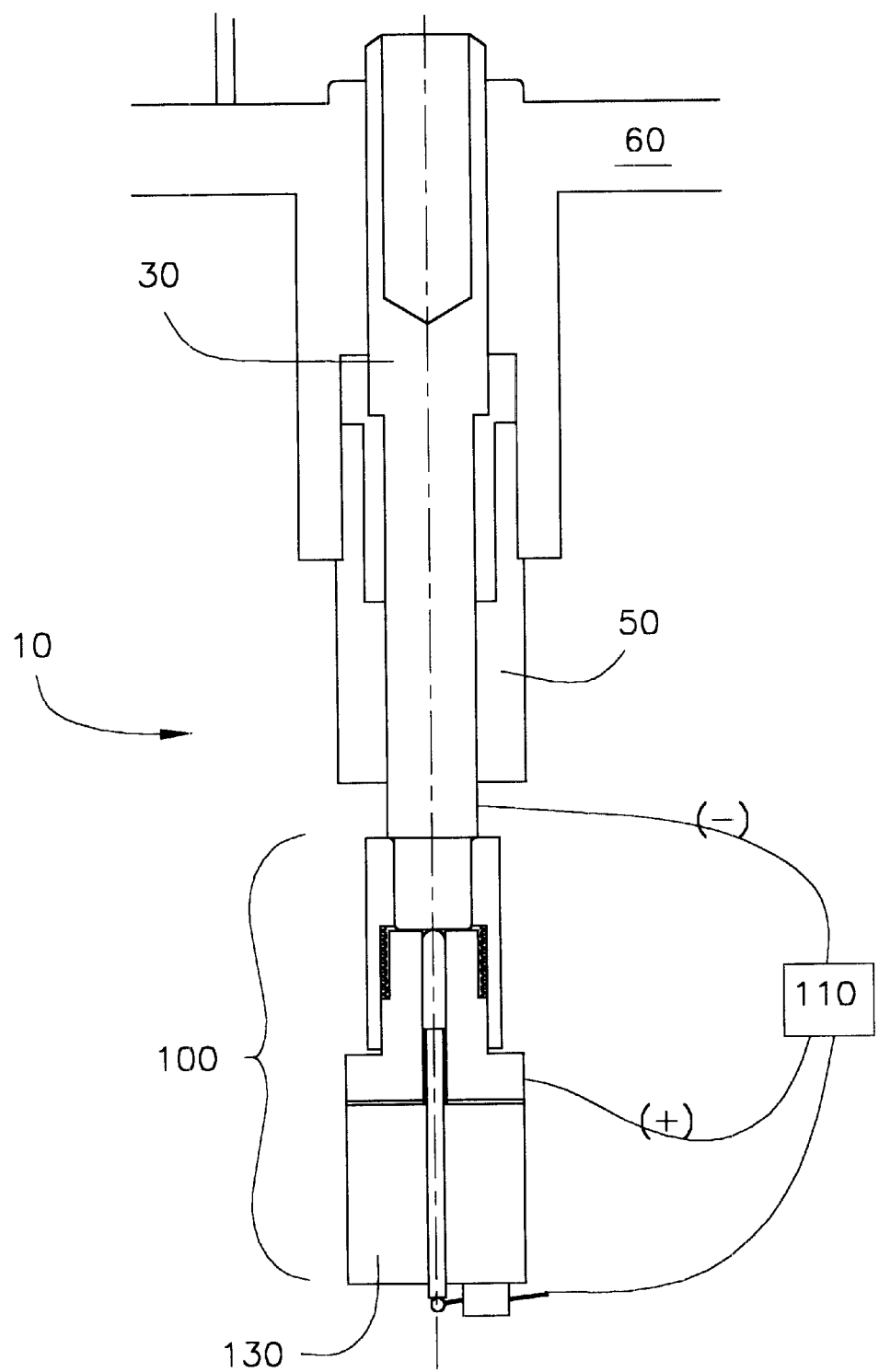
FIG. 3 is an enlargement of a different portion of the adjustable spacer system of FIG. 1.

Advantageously, a physical contact of switch block 140 and adapter shaft 30 completes an electrical circuit which is detected by controller 110. By using integral electrical contacts in this manner, any error associated with the use of external switching mechanisms is reduced or eliminated. A switch block housing 170, for example made of non-conductive material, surrounds switch block 140 and an end 70 of adapter shaft 30 when they are in contact. Switch block housing 170 may be non-conductive and such non-conductivity of switch block housing 170 may be used in conjunction with insulator 150 and guide 50 (FIG. 3) to electrically isolate switch block 140 and at least a portion of adapter shaft 30. Thus, a user may prevented from coming into contact with an electrical charge.

Switch block 140 and switch block housing 170 may be spaced apart, or separated from one another, when switch block 140 and adapter shaft 30 are spaced apart, for example, when ram assembly 100 has not been driven by motor 120 (FIG. 6) to adjust spacer 40. Switch block 140 and switch block housing 170 may be maintained spaced apart, for example, by one or more compression springs 175 or load rings between switch block 140 and switch block housing 170. Springs 175 may be enclosed by switch block housing 170.

Figure 5:
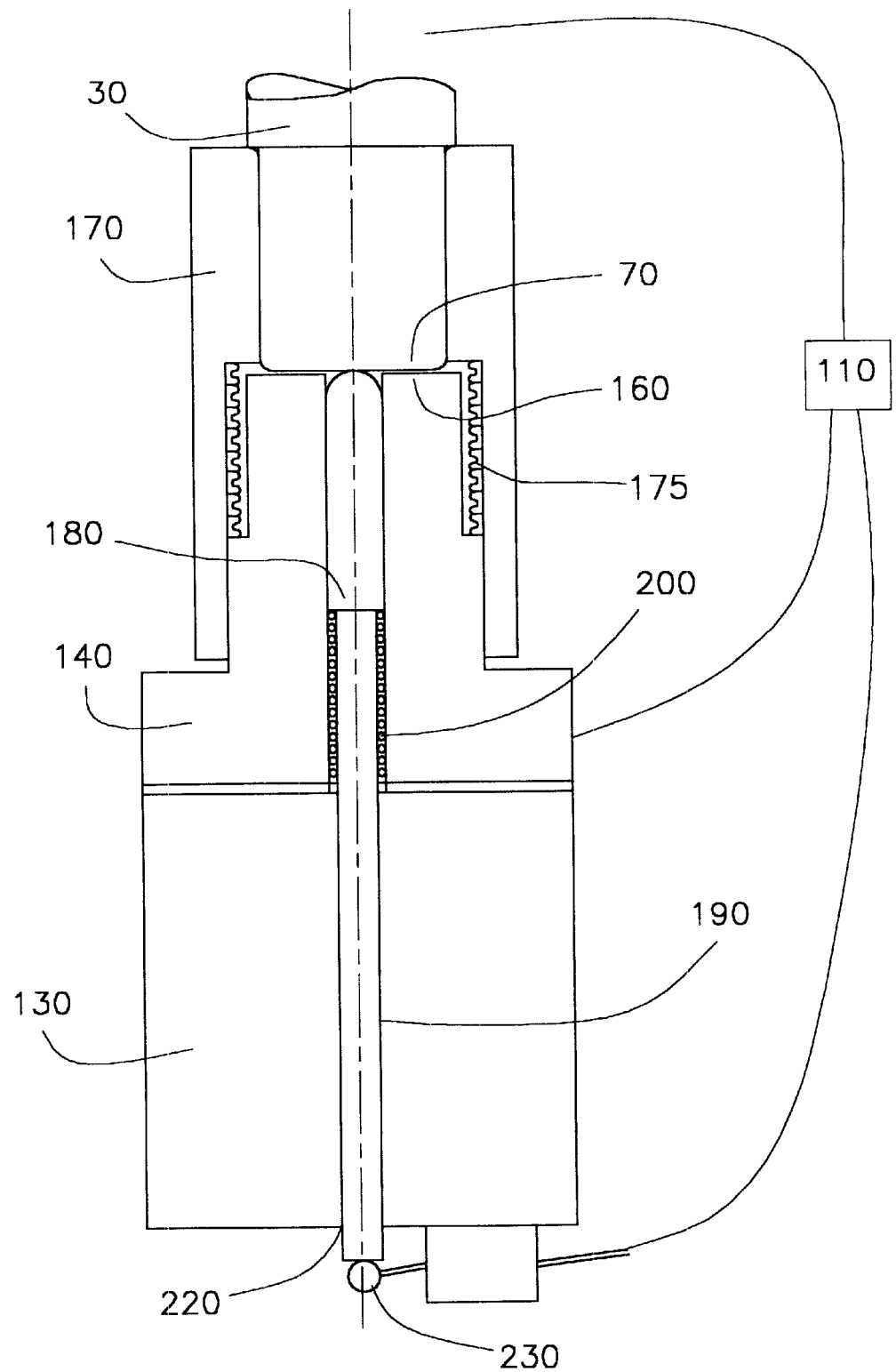
FIG. 5 is a depiction of the adjustable spacer system of FIG. 4 in contact with an adapter sleeve.

Adapter shaft 30 may have a shoulder 35, as illustrated in FIG. 4 and FIG. 5, which is adapted to mate with switch block housing 170. Pressure by switch block housing 170 on shoulder 35 thus results in springs 175 being compressed when adapter shaft 30 abuts switch block 140. The resistance provided by springs 175 enables switch block housing 170, switch block 140 and adapter shaft 30 to abut and mate at the same instant. Switch block housing 170 surrounds switch block 140 and end 70 of adapter shaft 30 to support, hold firm, and guide adapter shaft 30 and switch block 140. This insures that ram assembly and adapter shaft are axially aligned and in firm contact thus reducing a likelihood of slip therebetween and allows them to move forward toward bearing assembly 20 uniformly.

Ram assembly 100 may also include a distance detector to detect when ram assembly 100 approaches a certain distance from adapter shaft 30, for example about 0.020–0.040 inches. A follower rod 180 may be movable in a cavity of switch block 140 and ram 130. Follower rod 180 may be attached or acted on by springs 200, for example coil springs, which may bias follower rod 180 to protrude from cavity 90 toward adapter shaft 30 when there is not a force on follower rod 180 maintaining it within cavity 190. Follower rod 180 may be made of a nonconductive material, for example, a plastic material.

A contact of follower rod 180 with adapter shaft 30 may force follower rod 180 into cavity 190 and an end 210 of follower rod 180 may be forced to exit an end 220 of cavity 190 and to abut or contact a sensor 230. For example, follower rod 180 may be displaced about 0.5 inches. Controller 110 may then receive a signal from sensor 230 indicating the contact with follower rod 180 caused by the contact between adapter shaft 30 and switch block 140. This contact between follower rod 180 and adapter shaft 30 may occur, as noted above, for example, when adapter shaft 30 and switch block 140 are about 0.02–0.04 inches from one another.

After receiving the signal from sensor 230, controller 110 may alter a speed, for example, slow down ram assembly 100 from about twenty inches per minute to about one inch per minute. Controller 110 could also cause motor 120 to hold or stop ram assembly from further motion. Controller 110 is coupled to motor 120 (FIG. 6) which may be one or more motors and may drive one or more ball screws 250 to drive ram 130. Motor 120 (FIG. 6) may be preferably a servo motor, a drive of the servo motor may preferably have about a 150 to 1 reduction from the servo motor to the screw, and a ball bearing lead screw having a lead of 0.5 inches per revolution may be used, as is known by those skilled in the art.

Shortly after the speed of ram 130 is altered, for example less than a second, switch block 140 may contact adapter shaft 30 which might cause controller 110 to receive a signal of said contact due to an abutment of the electrical contacts. Controller 110 may then set a counter (not shown), for example set a counter equal to zero. The counter may be a portion of controller 110 or may separate therefrom. Controller 110 might then cause motor 120 to move ram assembly 100 toward adapter shaft 130 a certain distance, based on a baseline or starting point of the abutment of electrical contacts and the counter setting, to cause spacer 40 in bearing assembly 20 to be compressed or adjusted. Such an arrangement may allow an accuracy and repeatability of position control of adapter shaft 30 relative to a point of first contact between adapter shaft 30 and switch block 140 to be on the order of about one ten-thousandths of an inch.

The certain distance for ram assembly 100 to travel past this point of contact between adapter 30 and switch block 140 might be programmed or input into controller 110. Alternatively, for example, a type of bearing assembly might be input into controller 110 and controller 110 might determine through comparison with previously programmed information the certain distance for ram assembly 100 to travel to compress spacer 40 a predefined amount. Controller 110 might be a personal computer or a portion of a computer, such as a microprocessor or other computing component capable of performing the requirements of the present invention.

For explanatory purposes, a description of adjusting spacer 40 is provided. A user may cause bearing assembly 20 (FIG. 1), having one or more spacers 40 (FIG. 2), to be mounted to receive adapter shaft 30 (FIG. 1). An opposite end of bearing assembly may be mounted to prevent its motion away from spacer adjustment system 10. The user may program controller 110 based on a type of bearing assembly 20 (FIG. 1) to be worked upon. As illustrated in FIG's 4–5, when ram assembly 100 approaches adapter shaft 30, for example at a distance of 0.20–0.40 inches, follower rod 180 is forced within cavity 190 of ram assembly 100 causing an end of follower rod 180 to contact sensor 230 and relay to controller 110 that follower rod has abutted sensor 230. Controller 110 may then slow down the rate of forward motion of ram assembly 100, for example from about twenty inches per minute to about one inch per minute. After further movement, adapter shaft 30 may contact switch block 140 which may cause controller 110 to detect a completed circuit between adapter shaft 30 and switch block 140. Controller 110 may then set a counter to zero and may then cause motor 120 to drive ram assembly 100 toward bearing assembly 20 a distance defined by the programming of the user utilizing the point where the counter was set as a starting point. The force of the moving ram assembly 100 may thus be applied to bearing assembly 20 resulting in an adjustment of spacer 40. Such force might be on the order of 10,000 pounds.

In an alternative embodiment, spacer adjustment system 10 may be composed of one or more spacer adjustment systems. For example, two spacer adjustment systems might be axially aligned on two ends of bearing assembly 20 to apply forces thereto.

In yet another embodiment, adjustable spacer system 10 may be utilized to apply a force to a portion or a bearing assembly or work piece for other purposes, for example, to allow engagement of a gear of such a device.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims

What is claimed is:

1. A spacer-adjustment system for adjusting at least one spacer of a workpiece, said system comprising:
   a ram assembly;
   a contact detector for operatively detecting a contact between said ram assembly and the workpiece, said contact detector comprising a first sensor at least one of integral to and disposed on said ram assembly and a second sensor operatively coupled to the workpiece;
   a motor operatively connected to said ram assembly for operatively applying a force to the workpiece; and
   a controller, operatively connected to said contact detector, for controlling said motor to apply said force to adjust the at least one spacer.

2. The system of claim 1 further comprising a distance detector to detect a distance of said ram assembly relative to the workpiece.

3. The system of claim 2 wherein said distance detector further comprises a rod having a first end axially protrudable from a cavity of said ram assembly toward the workpiece.

4. The system of claim 3 wherein said rod is adapted to axially retreat into said cavity in response to an operative contact of the workpiece with a first end of said rod and wherein a second end of said rod is adapted to abut a sensor in response to a force placed on said rod by the operative contact of the workpiece with said first end of said rod.

5. The system of claim 4 wherein said sensor is adapted to provide an indication to said controller regarding the abutting of said sensor and said second end of said rod.

6. The system of claim 2 wherein said controller is coupled to said distance detector and said controller is adapted to control said motor to regulate a speed of said ram assembly when said distance detector detects said distance.

7. The system of claim 1 wherein said first sensor comprises a first electrical contact and said second sensor comprises a second electrical contact.

8. The system of claim 7 wherein said first electrical contact comprises at least a portion of a switch block of said ram assembly and said second electrical contact comprises at least a portion of an adapter shaft connectable to the device.

9. The system of claim 7 further comprising an adapter shaft connectable to the workpiece and configured to abut said ram assembly.

10. The system of claim 9 further comprising a housing for electrically isolating at least a portion of said ram assembly and said adapter shaft.

11. The system of claim 1 wherein said ram assembly further comprises a ram.

12. The system of claim 11 wherein said ram assembly further comprises a switch block connectable to said ram.

13. The system of claim 12 wherein said ram assembly further comprises an insulator between said ram and said switch block.

14. The system of claim 1 wherein said controller is adapted to control said motor to drive said ram assembly a predefined distance from said contact.

15. The system of claim 14 wherein said predefined distance is determined by said controller based on programming of said controller by a user.

16. The system of claim 1 wherein the workpiece comprises a worm gear speed reducer having at least one adjustable spacer.

17. The system of claim 1 wherein the at least one spacer is adapted to be adjusted due to said force being applied to an end of the workpiece.

18. The system of claim 1 wherein said ram assembly and the workpiece are axially aligned.

19. A method for adjusting at least one spacer of a workpiece, comprising:
   providing a ram assembly for operatively applying a force to an end of the workpiece;
   providing a contact detector for detecting a contact between the ram assembly and the workpiece, said contact detector comprising a first sensor at least one of disposed on and integral to said ram assembly and a second sensor operatively coupled to the workpiece;
   providing a motor operatively connected to the ram assembly;
   providing a controller for controlling the motor; and
   wherein the controller is coupled to the contact detector and the motor.

20. The method of claim 19 wherein the first sensor and the second sensor comprise a first electrical contact and a second electrical contact, respectively.

21. The method of claim 20 further comprising abutting the first electrical contact and the second electrical contact.

22. The method of claim 21 further comprising the contact detector providing an indication to the controller regarding the abutting.

23. The method of claim 22 further comprising the controller setting a counter based on the indication.

24. The method of claim 23 further comprising the controller controlling the motor to drive the ram assembly a distance based on the indication and the setting of the counter.

25. The method of claim 20 wherein the first electrical contact comprises at least a portion of a switch block of the ram assembly and the second electrical contact comprises at least a portion of an adapter shaft connectable to the workpiece.

26. The method of claim 19 further comprising providing a distance detector for detecting a distance of the ram assembly relative to the device.

27. The method of claim 26 further comprising the controller causing the motor to alter a speed of the ram assembly based on the distance detector detecting the distance of the ram assembly relative to the device.

28. The method of claim 19 further comprising programming the controller to control said motor to cause a desired adjustment of the at least one spacer.

29. The method of claim 28 further comprising applying a force to an end of the workpiece by the ram assembly driven by the motor controlled by the controller based on the programming of the controller to cause the desired adjustment.

30. The method of claim 19 wherein the providing a ram assembly comprises providing a ram and a switch block.

31. The method of claim 19 further comprising axially aligning the ram assembly and the workpiece.

32. A contact detector for use in a spacer adjustment apparatus, said detector comprising:
   a first electrical contact located on a ram assembly;
   a second electrical contact located on an adapter shaft connectable to a workpiece;
   a controller coupled to said first electrical contact and said second electrical contact; and
   wherein said controller is adapted to determine an abutting of said first electrical contact and said second electrical contact.

33. The system of claim 32 wherein said ram assembly and said workpiece are axially aligned.

34. The system of claim 32 wherein said first electrical contact comprises at least a portion of said ram assembly and said second electrical contact comprises at least a portion of said adapter shaft.

35. The system of claim 32 further comprising a distance detector to detect a distance of said ram assembly relative to said workpiece.

36. The system of claim 35 wherein said distance detector comprises a rod protruding from a cavity of said ram assembly for abutting said adapter shaft, wherein said rod is adapted to axially retreat into said cavity in response to the abutting.

37. The system of claim 35 wherein said distance detector further comprises a sensor and wherein said sensor is adapted to sense said rod contacting said sensor.

38. The system of claim 37 further comprising a controller coupled to said sensor for receiving an indication of the contacting of said rod with said sensor wherein said indication provides a determination of a distance of said adapter shaft relative to said ram assembly.

39. A spacer-adjustment system for adjusting at least one spacer of a workpiece, said system comprising:
   a ram assembly;
   means for detecting an initial position of an operative engagement of said ram assembly with the at least one spacer;
   a motor operatively connected to said ram assembly for operatively applying a force to the at least one spacer; and
   a controller operatively connected to said means for detecting, for controlling said motor to adjust the at least one spacer based on said initial position.

40. The system of claim 39 wherein said controller is adapted to control said motor to drive said ram assembly a predefined distance from said initial position to adjust the at least one spacer.

41. The system of claim 40 wherein said predefined distance is determined by said controller based on programming of said controller by a user.

* * * * *